United States Patent [19]
Stillwagon et al.

[11] Patent Number: 5,326,512
[45] Date of Patent: Jul. 5, 1994

[54] POROUS CERAMIC FILTER AND PREPARATION THEREOF

[75] Inventors: Thomas L. Stillwagon, Long Beach; Douglas J. Twait, Bellflower, both of Calif.

[73] Assignee: AlliedSignal Inc., Morris Township, Morris County, N.J.

[21] Appl. No.: 991,805

[22] Filed: Dec. 16, 1992

[51] Int. Cl.$^5$ .............................................. C04B 38/06
[52] U.S. Cl. ........................................ 264/44; 264/60; 210/510.1
[58] Field of Search .................. 264/44, 60; 210/510.1

[56] References Cited

U.S. PATENT DOCUMENTS

| | | | |
|---|---|---|---|
| 2,996,389 | 8/1961 | Fernhof | 264/44 |
| 3,725,186 | 4/1973 | Lynch | 264/60 |
| 4,379,109 | 4/1983 | Simpson | 264/60 |
| 4,816,036 | 3/1989 | Kotchick | |
| 4,913,982 | 4/1990 | Kotchick et al. | |
| 5,082,607 | 1/1992 | Tange | 264/44 |

FOREIGN PATENT DOCUMENTS 951306  3/1964  United Kingdom .................. 264/44

Primary Examiner—James Derrington
Attorney, Agent, or Firm—Robert A. Walsh; Joseph R. Black

[57] ABSTRACT

A ceramic filter is prepared by mixing together a ceramic powder, a pore forming agent, and any sintering aids required in the sintering of the ceramic powder, forming a tape from the mixture, and molding filter plates from the tape. Two types of annular disk filter plates are formed. A first plate type has an opening on the external annular surface, and a second plate type has an opening on the internal annular surface. The two types of filter plates are stacked in an alternating fashion, and end pieces are added to form a filter assembly. The assembly is sintered to form a filter. The pore forming agent is preferably polystyrene microspheres that are decomposed during the sintering process, leaving porosity that effectively captures particulate impurities when a fluid is passed through the filter in service.

25 Claims, 3 Drawing Sheets

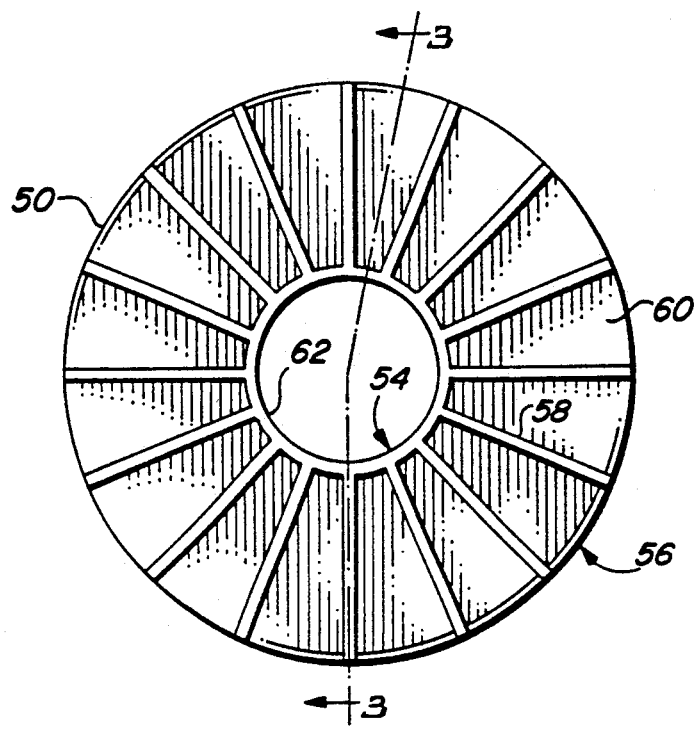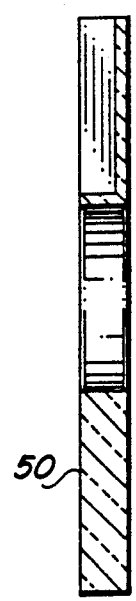
FIG-2  FIG-3
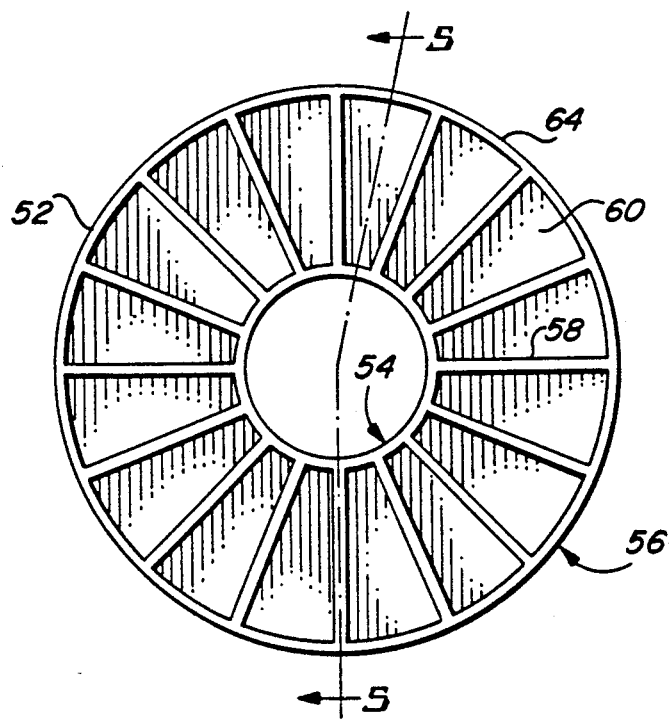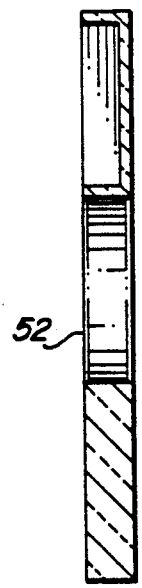
FIG-4  FIG-5

POROUS CERAMIC FILTER AND PREPARATION THEREOF

BACKGROUND OF THE INVENTION

This invention relates to the preparation and structure of filters for removing particulates from fluids, and, more particularly, to a cylindrical filter made from a ceramic having carefully sized open-celled porosity A filter is a device that removes solid matter from a fluid stream, either a gas or a liquid. Filters are primarily of two types. A screen-type filter creates an obstacle to passage for solid matter larger than the mesh size of a screen. A depth- or media-type filter presents a tortuous path through which the fluid and the entrained solid matter must pass. Solid matter is removed by adherence to the interior walls of the passageway. The media filter is able to remove solid matter smaller than the passageway size. The present invention deals with a filter that removes particulate from a fluid stream by both mechanisms.

The media filter must be constructed of a material that withstands the environmental conditions presented by the fluid stream, such as high temperatures, erosion, and corrosion. It must also have a reliably defined internal passageway structure through which the fluid passes. If the passageways have too large a size or provide too direct a path through the filter body, particles will pass through the filter. If the passageways have too small a size or too indirect a path, the filter presents too great a flow resistance to the fluid and becomes unacceptable as an element in a flow stream. The filter must be fabricated at an acceptably low cost for the particular application.

In some applications, the media filter must be able to withstand high fluid temperatures. The filter element must therefore be made of a ceramic material with a pattern of filtering passageways through the filtration membrane. Ceramic filter membranes can be prepared by loosely packing ceramic powders or using the right combination of sintering modifiers mixed with the ceramic powders. When such a mass is sintered (fired), porosity intentionally remains within the structure and provides the path through which the fluid flows. With this approach it is difficult to attain exactly the desired type of internal path. Even where the desired passageway structure is attained, assembling the filter elements with their supports, end plates, etc. into a filter structure may be difficult due to the difficulties in attaining reliable ceramic-to-metal or ceramic-to-ceramic seals.

There remains a need for a reliable, economically fabricated media filter utilizing ceramic filter elements. Such a filter must have a reliably fashioned internal passageway structure that is reproducible in the sense that each filter will achieve substantially the same filtering action and present the same flow resistance to fluids passing through the filter. The present invention fulfills this need, and further provides related advantages.

SUMMARY OF THE INVENTION

The present invention provides a reproducible, inexpensively fabricated ceramic media filter, and a method for its production. The passageway structure of the filter membranes is formed in a manner that ensures that each filter membrane will have the same flow resistance and remove the same types and sizes of particles from the fluid stream. This passageway structure may be controllably varied to achieve different filtering and flow-resistance characteristics as required. The filter is manufactured at a low cost, by virtue both of the low cost of individual filter membranes, and of the method of fabrication of the filter membranes into a filter structure.

In accordance with the invention, a method for preparing a ceramic filter comprises the steps of mixing together a ceramic powder, a pore-forming agent, and any sintering aids required in the sintering of the ceramic powder, and thereafter molding filter plates from the powder. The method further includes stacking the filter plates together to form a filter assembly, and sintering the filter assembly. Upon sintering, the pore-forming agents vaporize, decompose, or are otherwise removed from the structure, leaving a pattern of passageways through the filter membranes that is reproducible and reliable. In a preferred embodiment, the pore-forming agents are polystyrene microspheres that are mixed into the ceramic mixture, and the mixture is formed into plates. The microspheres are removed by decomposition during sintering.

Further in accordance with the invention, a method for preparing a ceramic filter comprises the steps of mixing together a ceramic powder, a pore forming agent, and any sintering aids required in the sintering of the ceramic powder and forming the mixture into a tape. Two types of cylindrical annular disk filter plates are molded from the tape, preferably using heated dies. A first filter plate type has an opening on an external periphery of the annular disk, and a second filter plate type has an opening on an internal periphery of the annular disk. The method further includes stacking the filter plates together in an alternating fashion with end pieces to form a filter assembly, and sintering the filter assembly. During sintering, the pore-forming agent leaves the structure, producing the required passageways.

This filter is economical to produce, as the entire ceramic structure is assembled as a unit prior to sintering. The sintering operation bonds the individual filter elements together, so that the interfaces between the stacked elements are virtually impossible to distinguish. The final filter may be described as monolithic, without joints that are likely to fail in service. There are no fasteners, post-sintering bonded joints, and the like. The resulting filter is unique in its reproducible internal passageway structure and monolithic structure.

BRIEF DESCRIPTION OF THE DRAWINGS

FIG. 2 is a plan view of a first type of annular disk filter plate;

FIG. 3 is a sectional view of the first type of annular disk filter of FIG. 2, taken along line 3—3;

FIG. 4 is a plan view of a second type of annular disk filter plate;

FIG. 5 is a sectional view of the second type of annular disk filter of FIG. 4, taken along line 5—5.

DETAILED DESCRIPTION OF THE INVENTION

Figure 1:
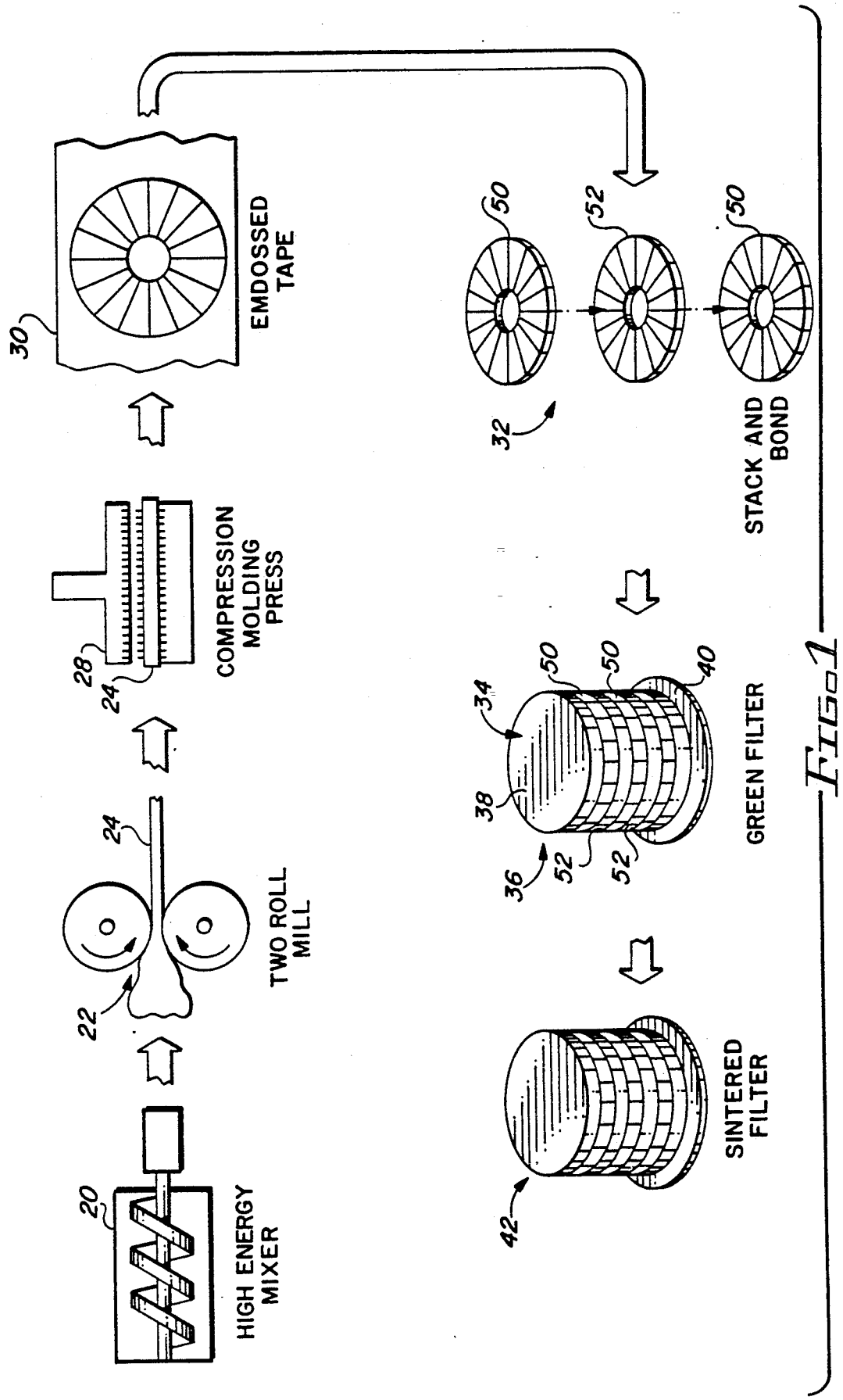
FIG. 1 is a pictorial flow diagram of an approach for preparing a filter according to the present invention.

FIG. 1 depicts the preferred method for preparing a filter. FIGS. 2-5 show components of the filter, and FIG. 6 the completed filter and its mode of operation.

Referring to FIG. 1, a ceramic mixture is prepared, numeral 20, as the precursor material for preparation of the filter elements. The mixture includes a ceramic powder, silicon nitride powder in the preferred case. Other ceramic powders may also be used, such as, for example, aluminum oxide, silicon carbide, mullite, zirconium oxide, and cordierite. The ceramic powder size distribution may vary depending upon the desired pore former size and the type of powder used. Generally, however, the ceramic powder has a size of −325 mesh. A virtue of the present approach is its ability to use a wide range of powder types and sizes, and the above information is presented as exemplary and not limiting.

The ceramic powder is mixed with whatever sintering aids may be appropriate, as is known in the art. For example, sufficient amounts of a plasticizer such as butyl benzyl pthalate and a binder such as polyvinyl butyral are often added to silicon nitride powder to promote its fabrication to an acceptable structure. The plasticizer aids in the mixing operation, while the binder holds the ceramic particles together as a cohesive mass until sufficient sintering has occurred so that the structure is self-supporting.

Also added to the mixture is a pore-forming agent. The preferred pore-former is polystyrene microspheres. These microspheres define small volumes within the mixture that are not filled with the ceramic powder. The microspheres are later removed from the mixture, as the polystyrene decomposes, becomes a vapor, and is removed from the structure as the ceramic mixture is heated to the sintering temperature during the sintering operation. The space previously filled by the microspheres becomes a well-defined open-celled porosity within the sintered ceramic structure, serving as the tortuous-path passageways through which the fluid flows and in which particulate in the fluid is trapped during the filtration operation. The microspheres are available in a wide variety of sizes and distributions of sizes. Selection of particular types and sizes and distributions of microspheres allows a variety of types of porosity to be engineered into the ceramic filter structure.

The amounts of the ceramic powder and the pore-forming agent are adjusted to yield the desired internal porous structure for the filter. The amounts of the sintering aids are selected to assist the sintering of the ceramic powder, and are generally selected independent of the porosity requirements. Preferably, the pore-forming agent should be present in an amount of at least about 40 volume percent of the total mixture. If lesser amounts are used, the porosity will not be of an open-celled type, and the pore-forming agent will not be able to escape entirely during sintering. Also, the closed-cell porosity will not pass fluid through the filter, and the filter will be inoperable. The pore-forming agent should not exceed about 55 volume percent of the mixture, or the ceramic structure will have insufficient surface for bonding and be structurally inadequate. The ceramic is present in a maximum amount of about 30 volume percent and a minimum amount of about 20 volume percent of the mixture, with the total of the sintering aids typically being about 20-30 volume percent. The sintering aids can vary as appropriate, with the plasticizer ranging from about 10 to about 15 volume percent of the mixture and the binder ranging from about 10 to about 15 percent of the mixture.

In a most-preferred embodiment, the mixture comprises about 51 volume percent of polystyrene microspheres of a size of 20-180 micrometers diameter, about 21 volume percent −325 mesh silicon nitride powder, about 14 volume percent of butyl benzyl pthalate plasticizer, and about 14 volume percent of polyvinyl butyral binder.

The mixture is added to a high-energy mixer, numeral 20, such as a sigma blade mixer. Mixing continues until a homogeneous mixture is reached, about 10 minutes in the preferred case. The mixture is preferably passed through rollers, numeral 22, to form a tape 24. The preferred tape is about ⅛ inch thick, but this value may be varied as may be required by the final filter design. Plates are formed from the tape by embossing a pattern into the tape using a compression molding press 28, which is preferably heated to about 200 degrees F. The press 28 utilizes dies that produce the desired embossed pattern in the tape, numeral 30.

In the preferred filter design, two types of filter plates 50 and 52 are utilized, as shown in FIGS. 2-5. In the preferred filter design, each type of filter plate is an annulus with an interior periphery 54 defining an internal collector and an exterior periphery 56 defining an external cylindrical surface. Each plate 50 and 52 is a generally flat plate with radially extending ribs 58 that define radial flow paths 60. The plates 50 and 52 differ in that the first plate 50 has an interior wall 62 at the interior periphery 54 but no comparable wall at the exterior periphery 56. The second plate 52 has an exterior wall 64 at the exterior periphery 56 but no comparable wall at the interior periphery. These two types of plates 50 and 52 are prepared from the tape 24 using two different die designs in the press 28. Equal numbers of the two plate types are prepared. The purposes of these walls will be apparent when the final filter structure is discussed subsequently.

The filter plates 50 and 52 may have any operable dimension. Preferably, the filter plates are rather thin and large in lateral dimension to provide a maximum filtering surface. In a preferred embodiment prepared as a reduction to practice of the invention, the plates types 50 and 52 were each about ⅛ inch thick, had an interior periphery diameter of about 1 inch, and had an exterior periphery diameter of about 5 inches.

Returning to FIG. 1, the filter plates are cut from the embossed tape 30 and stacked, numeral 32, in an alternating fashion such that each plate 50 has two adjacent plates 52 on either side, and each plate 52 has two adjacent plates 50 on either side (except at the ends of the stack). The individual plates are bonded to the neighboring plates in the stack in the unsintered ("green") state by applying a solvent between the plates and then pressure to the stack.

End pieces are preferably added to the stack of plates, numeral 34 to form a filter assembly 36. A solid end piece 38 is desirably placed at one end, and a flanged end piece 40 with a central opening is desirably placed at the other end of the stack of plates. The end pieces 38 and 40 are preferably made of the same material as the plates 50 and 52.

The filter assembly 36 is sintered, numeral 42, to complete the bonding of the pieces 38, 40, 50, and 52 to each other. The sintering treatment is selected to be appropriate for the ceramic powder and sintering aids provided. In the case of the preferred embodiment discussed above, the sintering procedure was to heat the filter assembly at a rate of about 5-10 degrees C. per minute to a temperature of 1800 degrees C. The assembly was held at this temperature for 2 hours, and cooled to ambient temperature at a rate of about 5-10 degrees C. per minute. The sintering treatment was performed in an atmosphere of 1500 pounds per square inch nitrogen gas. These sintering parameters are adjustable for the types of ceramics used.

Figure 6:
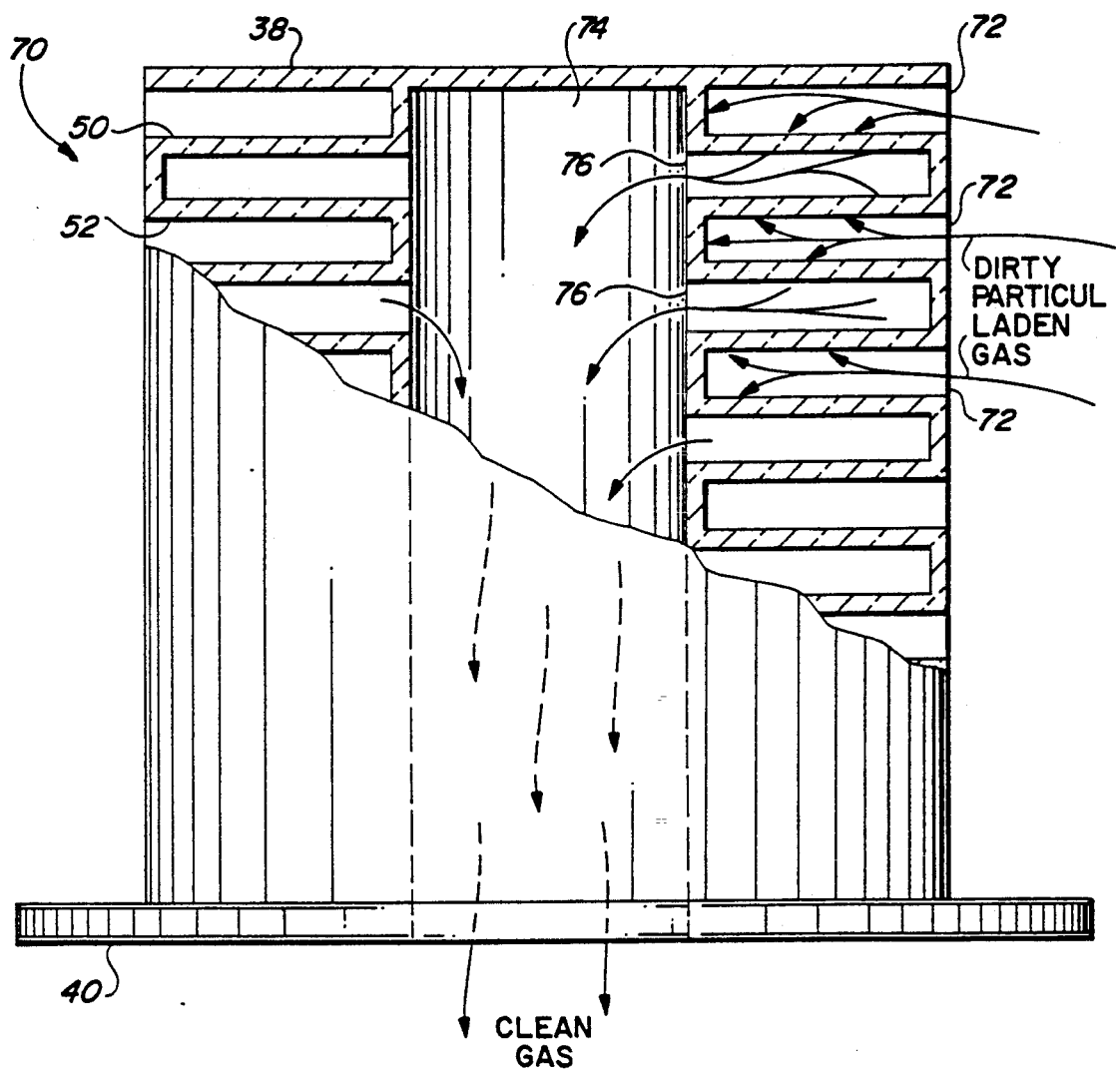
FIG. 6 is an elevational view, with portions broken away to show an internal sectioned structure, of the ceramic filter.

FIG. 6 illustrates the structure of a final sintered filter 70, with the previously discussed end pieces 38 and 40 and plates 50 and 52 indicated. The first filter plates 50, having the interior wall 62, leave an exterior opening 72 through which particulate-laden fluid enters the filter 70. This opening 72 may be seen from the exterior view of the filter in FIG. 1 as well.

The particulate-laden fluid flows into the filter 70 through the exterior opening 72. The pressure on the fluid causes it to flow through the plate 50 or 52, so that the particulate in the fluid is captured within the internal passageways of the ceramic material. The filtered, cleaned fluid, after passing through the plate 50 or 52, passes into an interior plenum 74 of the filter 70 through an interior opening 76. The interior opening 76 is formed in the second plates 52 as a result of the presence of the exterior wall 64 and absence of any interior wall in the second plates 52. The cleaned gas flows through the plenum 74 and out of the filter 70.

To ensure the continued filtering efficiency, low back pressure, and good flowthrough rate of the filter assembly during extended periods of operation, any large particulate captured from the fluid must be removed from the exterior filtering surfaces. Such particles would otherwise choke the filter and prevent fluid flow. To accomplish this cleaning, a reverse pulse of clean air is forced through the interior plenum to blow the captured particles from the exterior walls.

A filter according to the above-described preferred embodiment was fabricated and tested to filter coal ash from the gas stream of a fluidized bed combustor. The test continued for over 150 hours. The filter was effective in removing the ash from the gas stream, and could be readily cleaned as described above.

The present invention provides a filter that can be used at elevated temperatures and/or in corrosive or erosive environments, because the filter is made of a ceramic material. The filtering parameters, including size and nature of porosity, can be controlled during fabrication by selection of the type and size of the pore-forming material and the ceramic powder. The fabrication of the filter is economical, due to the mass-production of the filter elements, the plate 50 and 52. The filter is prepared as an integral unit that is joined together during sintering, obviating the need for bonding and joining treatments after sintering.

Although a particular embodiment of the invention has been described in detail for purposes of illustration, various modifications may be made without departing from the spirit and scope of the invention. Accordingly, the invention is not to be limited except as by the appended claims.

What is claimed is:

1. A method for preparing a cermic filter, comprising the steps of:

mixing together a ceramic powder, a pore forming agent, and any sintering aids required in the sintering of the ceramic powder;
   molding two types of annular filter plates from the powder one having an external opening and the other having an internal opening
   allernatingly stacking the types of the filter plates together to form a filter assembly, wherein the filter assembly has the form of a hollow body having an external sidewall with openings therein, and a plenum in the interior of the body; and
   sintering the filter assembly.

2. The method of claim 1, wherein the step of mixing together includes the step of
   providing silicon nitride ceramic powder.

3. The method of claim 1, wherein the step of mixing together includes the step of
   providing polystyrene spheres as the pore forming agent, and wherein at least a portion of the sintering step is performed in nitrogen gas.

4. The method of claim 1, wherein the step of molding includes the step of forming annular filter plates, and wherein the step of stacking includes the step of arranging the annular filter plates such that the filter assembly has the form of a hollow cylinder having an external cylindrical sidewall with openings therein, and a central opening.

5. The method of claim 1, wherein the step of mixing includes the step of providing from about 20 to about 30 percent by volume ceramic powder, from about 10 to about 15 percent by volume binder, from about 10 to about 15 percent by volume plasticizer, and from about 40 to about 55 percent by volume pore forming agent.

6. The method of claim 1, including the additional step, before the step of sintering, of
   placing end plates on the filter assembly, at least one of the end plates having an opening aligned with the plenum.

7. The method of claim 1, wherein a plurality of the two types of filter plates are formed in the step of molding, and the plurality of the two types of filter plates are stacked together in the step of stacking.

8. A method for preparing a ceramic filter, comprising the steps of:
   mixing together a ceramic powder, a pore forming agent, and any sintering aids required in the sintering of the ceramic powder;
   forming the mixture into a tape;
   molding two types of cylindrical annular disk filter plates from the tape,
      a first filter plate type having an opening on an external periphery of the annular disk, and
      a second filter plate type having an opening on an internal periphery of the annular disk;
   stacking the filter plates together in an alternating fashion with end pieces to form a hollow cylindrical filter assembly; and
   sintering the filter assembly.

9. The method of claim 8, wherein the step of mixing together includes the step of
   providing silicon nitride ceramic powder.

10. The method of claim 8, wherein the step of mixing together includes the step of
    providing polystyrene spheres as the pore forming agent, and wherein at least a portion of the sintering step is performed in nitrogen gas.

11. The method of claim 8, wherein the step of mixing includes the step of providing from about 20 to about 30 percent by volume ceramic powder, from about 10 to about 15 percent by volume binder, from about 10 to about 15 percent by volume plasticizer, and from about 40 to about 55 percent by volume pore forming agent.

12. The method of claim 8, including the additional step, before the step of sintering, of
placing end plates on the filter assembly, at least one of the end plates having an opening therein.

13. The method of claim 8, wherein a plurality of each of the two types of filter plates are formed in the step of molding, and the plurality of filter plates are stacked together in an alternating fashion in the step of stacking.

14. A method for preparing a ceramic filter, comprising the steps of:
mixing together a ceramic powder, a pore forming agent, a plasticizer, and a binder;
rolling the mixture into a tape;
molding two types of filter plates from the tape,
a first filter plate having a first plate interior periphery, a first plate exterior periphery, a first plate interior wall along the first plate interior periphery, and first plate ribs extending from the first plate interior wall toward the first plate exterior periphery, and
a second filter plate having a second plate interior periphery, a second plate exterior periphery, a second plate exterior wall along the second plate exterior periphery, and ribs extending from the second plate exterior wall toward the second plate interior periphery, the first plate interior periphery being configured to align with the second plate interior periphery when the first filter plate is stacked together with the second filter plate;
stacking the filter plates together with the first plate interior periphery and the second plate interior periphery aligned to form a filter assembly having an interior plenum; and
sintering the filter assembly.

15. The method of claim 14, wherein the step of mixing includes the step of providing from about 20 to about 30 percent by volume ceramic powder, from about 10 to about 15 percent by volume binder, from about 10 to about 15 percent by volume plasticizer, and from about 40 to about 55 percent by volume pore forming agent.

16. The method of claim 14, wherein the step of mixing toegether includes the step of
providing a ceramic powder selected from the group consisting of silicon nitride, aluminum oxide, mullite, silicon carbide, zirconium oxide, and cordierite.

17. The method of claim 14, wherein the step of mixing together includes the step of
providing polystyrene spheres as the pore forming agent, and wherein at least a portion of the sintering step is performed in nitrogen gas.

18. The method of claim 14, wherein the step of mixing together includes the step of
providing pore forming microspheres having a diameter of from about 20 to about 180 micrometers.

19. The method of claim 14, wherein a plurality of each of the two types of filter plates are formed in the step of molding, and the plurality of filter plates are stacked together in an alternating fashion in the step of stacking.

20. A method for preparing a ceramic filter, comprising the steps of:
mixing together a ceramic powder, a pore forming agent, and any sintering aids required in the sintering of the ceramic powder;
forming the mixture into a tape;
molding two types of disk filter plates from the tape, each of the filter plate types having an external periphery and an internal periphery,
a first filter plate type having an opening on an external periphery of the disk, and
a second filter plate type having an opening on an internal periphery of the disk;
stacking the filter plates together in an alternating fashion with end pieces to form a filter assembly having an internal plenum defined by the alignment of the internal peripheries of the two filter plate types; and
sintering the filter assembly.

21. The method of claim 20, wherein the ceramic powder is silicon nitride.

22. The method of claim 20, wherein the pore forming agent is polystyrene spheres, and at least a portion of the sintering step is performed in nitrogen gas.

23. The method of claim 20, wherein the composition of the mass prepared in the step of mixing is from about 20 to about 30 percent by volume ceramic powder, from about 10 to about 15 percent by volume binder, from about 10 to about 15 percent by volume plasticizer, and from about 40 to about 55 percent by volume pore forming agent.

24. The method of claim 20, including the additional step, before the step of sintering, of
placing end plates on the filter assembly, at least one of the end plates having an opening aligned with the internal plenum.

25. The method of claim 20, wherein a plurality of each of the two types of filter plates are formed in the step of molding, and the plurality of filter plates are stacked together in an alternating fashion in the step of stacking.

* * * * *